United States Patent [19]

Jethwa

[11] Patent Number: 4,869,934

[45] Date of Patent: Sep. 26, 1989

[54] FLOOR POLISHING AND COATING COMPOSITION

[75] Inventor: Anil P. Jethwa, Union, N.J.

[73] Assignee: Sterling Drug Inc., New York, N.Y.

[21] Appl. No.: 245,427

[22] Filed: Sep. 16, 1988

[51] Int. Cl.$^4$ .............................................. B05D 3/02
[52] U.S. Cl. ................................ 427/393.5; 524/145; 524/517
[58] Field of Search ................ 427/393.5; 524/145, 524/517

[56] References Cited

U.S. PATENT DOCUMENTS

| | | | |
|---|---|---|---|
| 3,728,418 | 4/1973 | Gleason | 260/898 |
| 3,793,275 | 2/1974 | Corey et al. | 260/28.5 |
| 4,013,607 | 3/1977 | Dwyer et al. | 260/29.6 |
| 4,017,662 | 4/1977 | Gehman et al. | 428/443 |
| 4,299,749 | 11/1981 | McCarthy et al. | 260/29.6 |
| 4,598,118 | 7/1986 | Hansen et al. | 524/517 |

Primary Examiner—Michael Lusignan

Attorney, Agent, or Firm—Frederik W. Stonner; Paul E. Dupont

[57] ABSTRACT

An aqueous cleaning, coating and polishing composition consisting essentially of 1 to 20% by weight of a water insoluble alkali soluble addition polymer comprising at least one hydrophilic monomer selected from acrylic acid and methacrylic acid and at least one hydrophobic monomer selected from alkyl acrylate and alkyl methacrylate, where alkyl has from 1 to 6 carbon atoms, and at least one hydrophobic monomer selected from styrene and monoalkylstyrene where monoalkyl has from 1 to 6 carbon atoms, 1 to 13% by weight of an alkyli soluble 2:1 to 3:1 styrene:acrylic acid resin, 5 to 15% by weight of a fugitive plasticizer, 1 to 3% by weight of a permanent plasticizer, 0.01 to 0.05% by weight of an anionic or nonionic fluorocarbon surfactant leveling agent, 0.0003 to 0.003% by weight of a dimethylpolysiloxane antifoaming agent; 0.0003 to 0.003% by weight of a 1,2-benzoisothiazol-3(2H)-one or 3(2H)-isothiazolone preservative, ammonia to provide a pH of 8.0 to 9.6 and water q.s. to 100%, the composition having a content of solids of from 10 to 25% by weight.

13 Claims, No Drawings

FLOOR POLISHING AND COATING COMPOSITION

BACKGROUND OF THE INVENTION

1. Field of the Invention

The invention relates to aqueous floor cleaning, coating and polishing compositions.

2. Information Disclosure Statement

Commercially available resilient floor coating and polishing products are either opaque, translucent or clear with some degree of haze or discoloration.

U.S. Pat. No. 3,728,418 describes floor polish compositions which include a specific ratio of a copolymer of styrene with acrylic acid or methacrylic acid and a multi-polymer consisting of styrene and a mixture of ethylenically unsaturated monomers.

U.S. Pat. No. 3,793,275 describes aqueous hard surface cleaning and polishing compositions having a pH in the range of 7.5 to 9.5 and which include an acrylic-based water insoluble film former.

U.S. Pat. No. 4,013,607 describes self-stripping aqueous coating compositions which include an alkali soluble resin having an acid value ranging between 120 and 550 and a weight average molecular weight from 500 to 40,000. A preferred alkali soluble resin is 68% styrene/32% acrylic acid resin having a weight average molecular weight of about 500 to 10,000. Aqueous ammonia is present in the composition to provide a pH of at least 9.0 and preferably above 9.5.

U.S. Pat. No. 4,017,662 describes water-clear aqueous coating compositions which include an alkali soluble, low molecular weight addition polymer which may be obtained by emulsion copolymerization of at least one hydrophilic monoethylenically α,β-unsaturated carboxylic acid monomer such as methacrylic acid and at least one hydrophobic monoethylenically unsaturated monomer such as an ester of acrylic or methacrylic acid. Optional monoethylenically unsaturated monomers such as styrene and vinyl toluene may be employed in preparing the addition copolymer.

U.S. Pat. No. 4,299,749 describes aqueous self-stripping floor cleaning, coating and polishing compositions which include a low molecular weight alkali soluble acrylic-type addition polymer comprising at least one hydrophilic monomer selected from acrylic acid and methacrylic acid interpolymerized with at least one hydrophobic monomer selected from alkyl acrylate and alkyl methacrylate.

U.S. Pat. No. 4,598,118 describes a coating composition which includes a terpolymer of an anhydride, a higher alphaolefin and a lower alphaolefin or a monoalkenyl aromatic compound, and an acrylic emulsion polymer having a weight average molecular weight of greater than 20,000. Additionally such compositions may include such resins as acrylic acid: styrene resins.

SUMMARY OF THE INVENTION

In one aspect of the invention there is provided an aqueous cleaning, coating and polishing composition consisting essentially of:

(a) from about 1 to 20% by weight of a water insoluble, alkali soluble addition polymer comprising from about 10 to 25% by weight of the addition polymer of at least one hydrophilic monomer selected from the group consisting of acrylic acid and methacrylic acid interpolymerized with from about 60 to 75% by weight of the addition polymer of at least one hydrophobic monomer selected from the group consisting of alkyl acrylate and alkyl methacrylate where alkyl in each case has from 1 to 8 carbon atoms, and 15 to 25% by weight of the addition polymer of at least one hydrophobic monomer selected from the group consisting of styrene and monoalkylstyrene, where monoalkyl has from 1 to 6 carbon atoms, said addition polymer having an intrinsic viscosity at 30° C. in tetrahydrofuran of about 0.12 to 0.14 dl/g; an average number molecular weight of from about 15,000 to about 20,000, an acid number between about 110 and 130 and a minimum film forming temperature below about 40° C. at pH 9 and below about 55° C. at pH 6;

(b) from about 1 to 13% by weight of an alkali soluble copolymer of styrene and acrylic acid, said copolymer having a styrene-acrylic acid ratio of about 2:1 to about 3:1, a weight average molecular weight of about 8000 and an acid number of about 210;

(c) from about 5 to 15% by weight of a fugitive plasticizer;

(d) from about 1 to 3% by weight of a permanent plasticizer;

(e) from about 0.01 to 0.05% by weight of an anionic or nonionic fluorocarbon surfactant;

(f) from about 0.0003 to 0.003% by weight of a dimethylpolysiloxane antifoaming agent;

(g) from about 0.0003 to 0.003% by weight of a 1,2-benzoisothiazol-3(2H)-one or 3(2H)-isothiazolone preservative;

(h) ammonia to provide a pH of 8.0 to 9.6;

and (i) water q.s. to 100%; said composition having a content of non-volatile solids of from about 10 to 25% by weight.

In a second aspect the invention provides a method for cleaning, coating and polishing a floor which comprises applying to the floor a thin layer of the aqueous cleaning, coating and polishing composition described hereinabove and allowing the applied composition to dry.

The composition of the invention is physically and optically clearer than most known floor polishing and coating compositions. It is essentially water clear without any haze or discoloration, having a clarity within the range of 3% to 5% of crystal clear drinkable water. Upon application to a flooring it dries within 20 minutes, under normal humidity and temperature conditions, to a thin, clear, colorless, glossy protective film which preserves the beauty and appearance of the flooring, exhibits outstanding surface shine (gloss) and clarity and provides excellent protection against normal foot traffic. The composition cleans and shines the flooring simultaneously and the coating is easily removable with household ammonia and detergents. The composition has good storage stability under temperature and humidity conditions normally encountered during storage.

DETAILED DESCRIPTION INCLUSIVE OF THE PREFERRED EMBODIMENTS

The composition of the invention can be employed for the maintenance of floors comprising a variety of substrates such as linoleum, vinyl, vinyl composition, etc., including no-wax flooring materials which, although coated with a "permanent" protective glossy coating comprising, e.g. a urethane type coating, nonetheless eventually tend to take on a dull appearance after prolonged use, particularly in high traffic areas.

The primary polishing and coating agent in the composition of the invention is a combination of a low molecular weight water insoluble, alkali soluble addition polymer and an alkali soluble resin.

The addition polymer is obtained by emulsion or solution polymerization of certain monoethylenically unsaturated hydrophylic and hydrophobic monomers, i.e., hydrophilic monoethylenically $\alpha,\beta$-unsaturated carboxylic acids and hydrophobic monoethylenically $\alpha,\beta$-unsaturated carboxylic esters and monovinyl aromatic compounds. The addition polymer should possess certain specific properties. It should have an average number molecular weight of from 15,000 to 20,000, an acid number from 110 to 130, a minimum film forming temperature (MFT) of or below 40° C. at pH 9 and of or below 55° C. at pH 6 and an intrinsic viscosity in tetrahydrofuran at 30° C. of about 0.12 to 0.14 dl/g. The addition polymer must comprise a critical proportion of the hydrophilic and hydrophobic monomers. Thus specifically the addition polymer comprises from about 10 to 25% by weight of at least one hydrophylic monomer selected from acrylic acid and methacrylic acid interpolymerized with about 60 to 75% by weight of at least one hydrophobic monomer selected from alkyl acrylate and alkyl methacrylate in which alkyl has from 1 to 8 carbon atoms and can be straight or branched and 15 to 25% by weight of the addition polymer of at least one hydrophobic monomer selected from monovinyl aromatic compounds such as styrene and monoalkyl substituted styrenes, where monoalkyl has from 1 to 6 carbon atoms and can be straight or branched, e.g. o, m and p-vinyltoluene. The polymerization procedures, including both emulsion and solution polymerization, whereby the addition polymer employed in the invention can be prepared are described in U.S. Pat. No. 4,017,662 incorporated herein by reference. The addition polymers is employed at a concentration of from about 1 to 20% by weight of the composition.

The alkali soluble resin, prepared by emulsion polymerization, is a copolymer of styrene and acrylic acid having a weight average molecular weight of about 8000 and an acid number of about 210 wherein the ratio of styrene to acrylic acid is in the range of about 2:1 to about 3:1. This styrene-acrylic copolymer is commercially available from Morton Thiokol Inc. under the tradename MOREZ 100. The alkali soluble resin is employed in the composition at a concentration of from about 1 to 13% by weight of the composition.

The composition of the invention contains as essential ingredients, in addition to the primary coating agent described hereinabove, a fugitive plasticizer, a permanent plasticizer, a leveling agent, an antifoaming agent, a preservative, ammonia and water. These essential ingredients are defined more fully hereinbelow.

The fugitive plasticizer enhances the film formation characteristics of the coating, accelerates drying, improves leveling and increases the gloss characteristics of the coating. The fugitive plasticizers which are preferred are water soluble higher boiling (about 150° to 200° C.) monohydric and polyhydric alcohols; and monoalkyl and dialkyl ethers of glycols, diglycols and polyglycols where alkyl is straight or branched and has from 1 to 5 carbon atoms. Examples of such fugitive plasticizers include diglyme, 2-butoxyethanol, 3-methoxybutanol-1, the monomethyl, monoethyl and monobutyl ether of diethyleneglycol, dipropylene glycol or polypropylene glycols, ethylene glycol, propylene glycol and polypropylene glycols. A particularly preferred fugitive plasticizer is dipropylene glycol methyl ether. The fugitive plasticizer is employed at a concentration of from about 5 to 15% by weight of the composition.

The permanent plasticizer enhances film formation and the leveling characteristics of the coating and is essential to achieve flexibility and hardness of the film. Examples of suitable permanent plasticizers include benzyl butyl phthalate, dimethyl phthalate, dibutyl phthalate, triphenyl phosphate, tributoxyethyl phosphate and tributyl phosphate. Tributoxyethyl phosphate is particularly preferred, having an extremely high compatibility in the compositions. The permanent plasticizer is employed in a concentration of from about 1 to 3% by weight of the composition.

The composition of the invention contains as leveling agent from 0.01 to 0.05% by weight of a nonionic or anionic fluorocarbon surfactant. Such surfactants are well known in the polish formulation art and are commercially available, for example, from E. I. Du Pont de Nemours & Co., Inc. under their tradename ZONYL. Suiable leveling agents are, for example, the fluorocarbon surfactants having the general formula $(C_aX'_{2a+1})fZ$, wherein a is a number from 6 to 12, $X'$ is selected from fluorine and hydrogen, at least 55% by weight of $C_aX'_{2a+1}$ being fluorine, f is a number from 1 to 8, and Z is a water solubilizing radical such that $(C_aX'_{2a+1})fZ$ has some degree of water solubility. Suitable radicals represented by Z are those containing acid groups including sulfonic acid groups and their salts, substituted sulfuric acid groups and their salts and substituted phosphoric acid groups and their salts in which the substituents are preferably alkyl radicals of 1-5 carbon atoms and the like, the salts in all said salt groups preferably being either alkali metal, ammonium, alkaline earth metal or amine salts; amine salt groups; polyhydroxy groups such as glycols, polyols and the like; polyoxyalkylene groups; substituted short chain amino acid groups and their salts as defined above; carboxy acid groups and their salts as defined above; hydroxy groups; and amide groups and substituted amide groups in which the substituent is preferably alkyl of 1-5 carbon atoms. Such fluorocarbon surfactant leveling compounds are described in more detail in U.S. Pat. No. 2,937,098, incorporated herein by reference.

Other fluorocarbon leveling compounds that can be employed in the instant invention are perfluorinated alkyl-substituted cyclohexane acids and salts thereof and perfluorinated cyclohexylalkane acids and salts thereof. The acids and salts of the aforesaid leveling agents include the sulfonic acids, carboxylic acids and phosphonic acids and the alkali metal, ammonium and alkaline earth metal salts of the above acids. These leveling compounds are described in U.S. Pat. Nos. 2,593,737, 2,732,398 and 3,163,547, incorporated herein by reference.

The composition of the invention contains from about 0.0003 to 0.003% by weight of an antifoaming agent. The antifoaming agent employed is a dimethylpolysiloxane compound adapted to control foaming in aqueous systems. The use of dimethylpolysiloxane antifoaming agents in floor polishing compositions is well known in the art. Dimethylpolysiloxane antifoaming compounds are commercially available, for example from SWS Silicones Division of Stauffer Chemical Company, under the tradename SWS, such as SWS-211, SWS-213 and SWS-214, which are aqueous emulsions containing respectively 10%, 30% and 10% of a dimethylpolysiloxane anti-foaming agent having a density of 8.3 lbs./gal. and having viscosities (Brookfield RVF, Spindles 1-7) of 5000, 15,000 and 1000 respectively. SWS-211 is a preferred antifoaming agent.

The preservative employed in the composition of the invention is selected from 1,2-benzoisothiazol-3(2H)-one, halo derivatives thereof, their water soluble salts and mixtures thereof, and 3(2H)-isothiazolone derivatives, their water soluble salts, metal complexes thereof and mixtures thereof. The benzoisothiazol-3(2H)-ones are well known biocides (see U.S. Pat. No. 3,065,123) and are commercially available, e.g., from ICI Americas Inc. under the tradename PROXEL. The 3(2H)-isothiazolones are also well known biocides (see U.S. Pat. Nos. 3,761,488 and 3,870,795) and are commercially available from Rohm & Haas Company under the tradename KATHON. These preservatives provide prolonged protection of the composition against infection and hence deterioration by microorganisms thus providing for good storage stability. The preservative is employed at a concentration of about 0.0003 to 0.003% by weight.

The instant composition should have a solids content of from about 10 to 25% by weight in order to provide a coating of suitable thickness. The term "solids" as used herein refers to the non-volatiles of the instant composition, i.e., those ingredients which in combination comprise the protective coating film deposited from the instant composition. The ingredients which comprise the non-volatiles in the composition are the addition polymer, the styrene-acrylic resin, the permanent plasticizer, the fluorocarbon surfactant, the antifoaming agent and the preservative. Preferably the solids content is about 15 to 20% by weight.

The composition of the invention contains sufficient ammonia to provide a pH of 8.0 to 9.6. A preferred pH is 8.2 to 8.8 in which range the clarity of the coating is within about 3% of drinkable water. The ammonia conveniently can be added as ammonium hydroxide.

The composition of the invention can include certain optional ingredients disclosed hereinbelow.

The composition of the invention optionally can include an anionic or nonionic optical brightener, also known as a fluorescent whitening agent, in order to overcome any trace of discoloration which might develop on prolonged storage. It also provides a bluish hue, more appealing to consumer perception. Optical brighteners which can be employed include for example those of the stilbene, benzoxazole and distyryldiphenyl types, all of which types are well known in the art. The optical brightener generally will be employed at a concentration of from about 0.0001 to 0.001% by weight of the composition.

The composition of the invention optionally can include up to 0.3% by weight of formaldehyde to ensure "quick kill" of any microorganisms with which the instant composition may become contaminated, particularly during manufacture and packaging. The formaldehyde, if employed, can be conveniently added as a 37% solution in water (formalin).

The composition of the invention optionally can include up to 0.2% by weight of caprolactam as a semifugitive plasticizer to aid in film formation.

The composition optionally can also include up to about 1% by weight of benzyl alcohol in order to speed drying after application.

The instant composition can also include a fragrance in order to mask the odors of certain ingredients such as the plasticizer, ammonia, etc. as well as a water soluble dye in order to impart a pleasing aesthetic effect to the composition.

The composition of the invention can be applied to flooring using well known techniques, e.g. by mopping with a suitable mop such as a sponge mop. Conveniently the instant composition is applied with a damp sponge mop with occasional water rinsing of the mop. The composition should be applied to flooring as an even thin layer and allowed to dry thoroughly. Drying, under normal conditions of temperature and humidity, will be complete in about 20 minutes.

The composition of the invention is an essentially water clear liquid having good storage stability. It has good cleaning properties and the film deposited therefrom is clear and resistant to discoloration, has a high gloss, and exhibits good wearability, scuff resistance and water and water spotting resistance. Furthermore the film is readily removed with household ammonia and detergents.

The composition of the invention is conveniently prepared as follows:

Approximately 90% of the water employed is charged into a mixing tank and with continuous agitation the following ingredients are added at 5 minute intervals: addition polymer, styrene-acrylic resin, fugitive plasticizer, permanent plasticizer, fluorocarbon surfactant, antifoaming agent, preservative and optional ingredients. Agitation is continued for 20 minutes and the pH then is adjusted to the desired value with ammonium hydroxide and the remainder of the water then is added. Agitation is continued for about 20 minutes and the composition is then filtered using a 30 micron filter.

The invention is illustrated by the following example without, however, being limited thereto.

EXAMPLE 1

| Ingredient | Wt - % |
| --- | --- |
| Addition Polymer (40.5%)[a] | 31.2 |
| Styrene-Acrylic Resin (15%)[b] | 9.3 |
| Dipropylene Glycol Methyl Ether | 7.0 |
| SWS-211 (10%)[c] | 0.003 |
| Zonyl FSN (40%)[d] | 0.03 |
| Tributoxyethyl Phosphate | 1.6 |
| Ecco White Nylon FW-5 (1%)[e] | 0.02 |
| Kathon CG/ICP (1.5%)[f] | 0.05 |
| Ammonium Hydroxide (28%) | 2.6 |
| Water (soft) | 48.197 |
| | 100.000 | pH = 8.3
Non-volatile Solids = 15.7%

[a]The addition polymer has a monomer composition of methacrylic acid (18%), butylacrylate (10%), methyl methacrylate (52%) and styrene (20%), an average number molecular weight of 18,000, an acid number of 110, a minimum film forming temperature of 40° C. at pH 9 and 52° C. at pH 6 and an intrinsic viscosity in tetrahydrofuran (30° C.) of 0.13 dl/g.
[b]Solution in water, adjusted to pH 8.8 with ammonium hydroxide, of 2:1 to 3:1 ratio of a styrene:acrylic acid copolymer having a weight average molecular weight of approximately 8000 and an acid number of approximately 210, available as a powder from Morton Thiokol Inc. under the tradename MOREZ 100.
[c]Dimethylpolysiloxane antifoaming agent commercially available from SWS Silicones Corp.
[d]Nonionic fluorocarbon surfactant commercially available from E.I. DuPont de Nemours & Co., Inc.; a solution in 30% isopropyl alcohol of a fluorocarbon surfactant represented by the formula $F(CF_2CF_2)_nCH_2CH_2O(CH_2CH_2O)_xH$ where n is 3 to 8 and x is 3 to 6.
[e]Aqueous solution of optical brightener of the distyryl-diphenyl type commercially available from Eastern Color and Chemical Company as a 20% aqueous solution.
[f]An aqueous solution containing 1.15% of 5-chloro-2-methyl-3(2H)—isothiazolone and 0.35% 2-methyl-3(2H)—isothiazolone commercially available from Rohm & Haas Company; the solution additionally contains as inert materials 1% magnesium chloride and 23% of magnesium nitrate.

In order to demonstrate the advantage, both as to clarity of composition and gloss of coating, of employing the specific combination of addition polymer and alkali soluble copolymer of the invention, over compositions essentially identical in all respects to the composition of the invention but either employing only the addition polymer or the addition polymer in combination with an alkali soluble copolymer of a different type than that employed in the composition of the invention, the following comparative formulations were prepared and compared with the composition of the invention.

COMPARATIVE EXAMPLES A, B AND C

| Ingredient | Wt - % A | B | C |
|---|---|---|---|
| Addition Polymer (40.5%)[a] | 34.7 | 31.2 | 31.2 |
| Alkali Soluble Copolymer (15%) | — | 9.3[b] | 9.3[c] |
| Dipropylene Glycol Methyl Ether | 9.0 | 7.0 | 7.0 |
| SWS-211 (10%)[d] | 0.003 | 0.003 | 0.003 |
| Zonyl FSN (40%)[e] | 0.03 | 0.03 | 0.03 |
| Tributoxyethyl Phosphate | 1.6 | 1.6 | 1.6 |
| Ecco White Nylon FW-5 (1%)[f] | 0.02 | 0.02 | 0.02 |
| Kathon CG/ICP (1.5%)[g] | 0.05 | 0.05 | 0.05 |
| Ammonium Hydroxide (28%) | 1.93 | 1.8 | 2.1 |
| Water (soft) | 52.667 | 48.997 | 48.697 |
| | 100.000 | 100.000 | 100.000 |
| pH | 8.3 | 8.3 | 8.4 |
| Non-volatile solids | 16.4 | 15.9 | 16.1 |

[a]See footnote (a), Example 1.
[b]Solution in water, adjusted to pH 9.1 with ammonium hydroxide, of a copolymer of 1:1 to 3:1 styrene:maleic anydride having an average number molecular weight of 1900, a melting range of 135–150° C., a viscosity under 30 cps and an acid number of 220, commercially available as a powder from Arco Chemical Company under the tradename SMA 2625.
[c]Solution in water, adjusted to pH 8.9 with ammonium hydroxide, of alkyl ($C_{1-8}$) acrylate, alkyl ($C_{1-8}$) methacrylate and acrylic or methacrylic acid having an ester to acid ratio of 3:1 to 5:1, a weight average molecular weight of 9000 and an acid number of 95 commercially available as a powder from Interpolymer Corporation under the tradename Syntron 1545.
[d], [e], [f], [g]See footnotes (c), (d), (e) and (f) respectively, Example 1.

Each of the compositions of Example 1 and Examples A to C was tested for storage stability in a closed glass container at room temperature for 1 year, 105° F. for 12 weeks and 120° F. for 6 weeks and all were found to be stable under these temperature conditions.

The appearance immediately after preparation of the compositions of Example 1 and comparative Examples A to C was as follows: Example 1: crystal clear; Example A: clear with slight haze; Examples B and C: clear with a yellow cast.

The compositions of Example 1 and Examples A to C as well as identical compositions in each case with the pH adjusted over the range of 7.7 to 9.6 were compared for solution clarity. Solution clarity was determined by percent light transmission as measured wit a Beckman spectrometer, Model DB-G, using a 10 mm. path length cell at 525 mu wave length and 0.043 slit opening. The results, expressed as % light transmission, were as follows:

CLARITY OF COATING COMPOSITION

| Example: 1 | A | B | C | pH |
|---|---|---|---|---|
| 91 | 86 | 89 | 87 | 7.7 |
| 93 | 86 | 89 | 89 | 7.8 |
| 93 | 87 | 90 | 88 | 7.9 |
| 95 | 89 | 89 | 89 | 8.0 |
| 96 | 90 | 91 | 92 | 8.1 |
| 97 | 93 | 91 | 90 | 8.2 |
| 97 | 93 | 93 | 91 | 8.3 |
| 97 | 91 | 92 | 91 | 8.4 |
| 97 | 93 | 92 | 90 | 8.5 |
| 97 | 92 | 93 | 91 | 8.6 |
| 97 | 91 | 90 | 92 | 8.8 |
| 96 | 92 | 92 | 92 | 9.0 |
| 96 | 93 | 91 | 91 | 9.2 |
| 97 | 93 | 93 | 91 | 9.4 |
| 96 | 92 | 92 | 91 | 9.6 |

The above results demonstrate the superior clarity of Example 1 over Examples A to C at different pH values and that at pH values of 8.0 to 9.6 the composition of Example had a clarity of from 3 to 5% of crystal clear drinkable water.

The clarity, expressed as % light transmission of the 15% solution of styrene-acrylic resin employed in Example 1 and the 15% solutions of alkali soluble polymer employed in Examples B and C was as follows:

| | Clarity |
|---|---|
| Example 1 | 98 |
| Example B | 94 |
| Example C | 93 |

Each of compositions of Example 1 and A to C (pH=8.3, 8.3, 8.3 and 8.4 respectively) was applied as an even thin layer to various substrates and allowed to dry thoroughly and the surface gloss of the coated substrates was determined using the ASTM-D 1455-82 method (American Standard of Testing Methods). The results, expressed as % light reflectance, were as follows:

Surface Gloss of Coating

| Substrate | Example 1 | A | B | C |
|---|---|---|---|---|
| Black Vinyl | 93 | 89 | 90 | 87 |
| Black Vinyl Composition | 64 | 61 | 60 | 58 |
| Dark Color No-Wax | 55 | 55 | 53 | 53 |
| White Vinyl | 91 | 84 | 86 | 79 |
| White Vinyl Composition | 60 | 55 | 53 | 48 |
| Light Color No-Wax | 36 | 32 | 31 | 31 |

The above results show that the gloss on all substrates of the coating from the composition of Example 1 was superior to that of the coatings from the compositions of Examples A to C.

What is claimed is:

1. An aqueous cleaning, coating and polishing composition consisting essentially of:
(a) from about 1 to 20% by weight of a water insoluble, alkali soluble addition polymer comprising from about 10 to 25% by weight of the addition polymer of at least one hydrophilic monomer selected from the group consisting of acrylic acid and methacrylic acid interpolymerized with from about 60 to 75% by weight of the addition polymer of at least one hydrophobic monomer selected from the group consisting of alkyl acrylate and alkyl methacrylate where alkyl in each case has from 1 to 8 carbon atoms, and 15 to 25% by weight of the addition polymer of at least one hydrophobic monomer selected from the group consisting of styrene and monoalkylstyrene, where monoalkyl has from 1 to 6 carbon atoms, said addition polymer having an intrinsic viscosity at 30° C. in tetrahydrofuran of about 0.12 to 0.14 dl/g; an average number molecular weight of from about 15,000 to about 20,000, an acid number between about 110 to 130 and a minimum film forming temperature below about 40° C. at pH 9 and below about 55° C. at pH 6;

(b) from about 1 to 13% by weight of an alkali soluble copolymer of styrene and acrylic acid, said copolymer having a styrene-acrylic acid ratio of about 2:1 to about 3:1, a weight average molecular weight of about 8000 and an acid number of about 210;

(c) from about 5 to 15% by weight of a fugitive plasticizer;

(d) from about 1 to 3% by weight of a permanent plasticizer;

(e) from about 0.01 to 0.05% by weight of an anionic or nonionic fluorocarbon surfactant;

(f) from about 0.0003 to 0.003% by weight of a dimethylpolysiloxane antifoaming agent;

(g) from about 0.0003 to 0.003% by weight of a 1,2-benzoisothiazol-3(2H)-one or 3(2H)-isothiazolone preservative;

(h) ammonia to provide a pH of about 8.0 to about 9.6;

and (i) water q.s. to 100%; said composition having a content of non-volatile solids of from about 10 to 25% by weight.

2. A composition according to claim 1 wherein the addition polymer comprises methacrylic acid interpolymerized with at least one alkyl acrylate and styrene.

3. A composition according to claim 2 wherein the fugitive plasticizer is selected from the group consisting of monohydric alcohols, polyhydric alcohols and monoalkyl and dialkyl ethers of glycols, diglycols and polyglycols, where alkyl in each case has 1 to 5 carbon atoms.

4. A composition according to claim 3 wherein the fugitive plasticizer is selected from the group consisting of diglyme, 2-butoxyethanol, 3-methoxybutanol-1, ethylene glycol, propylene glycol, polypropylene glycol, and the monoalkyl ether of diethylene glycol, dipropylene glycol and polypropylene glycol; and the permanent plasticizer is selected from the group consisting of benzyl butyl phthalate, dimethyl phthalate, dibutyl phthalate, triphenyl phosphate, tributoxyethyl phosphate and tributyl phosphate.

5. A composition according to claim 4 wherein the content of non-volatile solids is from about 15 to 20% by weight.

6. The composition according to claim 5 wherein the addition polymer comprises methacrylic acid interpolymerized with butyl acrylate, methyl methacrylate and styrene.

7. The composition according to claim 6 wherein the addition polymer contains 18% by weight of methacrylic acid, 10% by weight of butyl acrylate, 52% by weight of methyl methacrylate and 20% by weight of styrene and has an intrinsic viscosity of about 0.13 dl/g, an average number molecular weight of about 18,000, an acid number of about 110 and a minimum film forming temperature of 40° C. at pH 9 and 52° C. at pH 6.

8. The composition according to claim 7 consisting essentially of:

(a) from about 1 to 20% by weight of the addition polymer;

(b) from about 1 to 13% by weight of the alkali soluble copolymer of styrene and acrylic acid;

(c) from about 5 to 15% by weight of dipropylene glycol methyl ether;

(d) from about 1 to 3% by weight of tributoxyethyl phosphate;

(e) from about 0.01 to 0.05% by weight of a fluorocarbon surfactant of the formula $F(CF_2CF_2)_nCH_2CH_2O(CH_2CH_2O)_xH$ where n is 3 to 8 and x is 3 to 6;

(f) from about 0.0003 to 0.003% by weight of a dimethylpolysiloxane antifoaming agent;

(g) from about 0.0003 to 0.003% by weight of a 3(2H)-isothiazolone preservative;

(h) ammonia to provide a pH of 8.0 to 9.6;

(i) water q.s. to 100%; said composition having a content of non-volatile solids of from about 10 to 25% by weight.

9. The composition according to claim 8 wherein the preservative is a mixture of 5-chloro-2-methyl-3(2H)-isothiazolone and 2-methyl-3(2H)-isothiazolone.

10. The composition according to claim 9 consisting essentially of about 12 to 13% by weight of (a); about 1 to 2% by weight of (b); about 6 to 8% by weight of (c); about 1 to 2% by weight of (d); about 0.01 to 0.02% by weight of (e); about 0.0003 to 0.0004% by weight of (f); about 0.0007 to 0.0008% by weight of (g); ammonia to provide a pH of 8.0 to 9.6; and water q.s. to 100%; said composition having a content of non-volatile solids of from about 15 to 16% by weight.

11. The composition according to claim 10 wherein the ammonia provides a pH of 8.2 to 8.8.

12. The composition according to claim 11 wherein the ammonia provides a pH of about 8.3.

13. A method of cleaning, coating and polishing a floor which comprises applying to the floor a layer of the composition of claim 1 and allowing the applied layer to dry.

* * * * *